United States Patent [19]

Morifuji

[11] Patent Number: 5,240,692
[45] Date of Patent: Aug. 31, 1993

[54] BASIC MAGNESIUM CARBONATE AND PROCESS FOR PREPARATION THEREOF

[75] Inventor: Tetsuhiko Morifuji, Tokuyama, Japan

[73] Assignee: Tokuyama Soda Kabushiki Kaisha, Tokuyama, Japan

[21] Appl. No.: 928,649

[22] Filed: Aug. 17, 1992

Related U.S. Application Data

[63] Continuation of Ser. No. 709,813, Jun. 4, 1991, abandoned.

[30] Foreign Application Priority Data

Jun. 4, 1991 [JP] Japan .................. 2-144491

[51] Int. Cl.$^5$ ................. C01F 5/24; C01F 15/14
[52] U.S. Cl. ........................ 423/431; 423/430; 423/637; 423/638
[58] Field of Search ............ 423/415 R, 419 R, 422, 423/430, 431, 637, 638, 421, 423, 427, 428, 164, 165

[56] References Cited

U.S. PATENT DOCUMENTS

| | | | |
|---|---|---|---|
| 689,345 | 12/1901 | Young | 423/430 |
| 2,027,714 | 6/1936 | Abrahams | 423/159 |
| 2,029,753 | 7/1940 | Abrahams et al. | 423/430 |
| 2,357,987 | 9/1944 | Winding | 423/430 |

FOREIGN PATENT DOCUMENTS

31314 2/1986 Japan .
63526 4/1986 Japan .

Primary Examiner—Michael Lewis
Assistant Examiner—Stephen G. Kalinchak
Attorney, Agent, or Firm—Sherman and Shalloway

[57] ABSTRACT

Disclosed is a novel basic magnesium carbonate represented by the following general formula:

$$nMgCO_3 \cdot Mg(OH)_2 \cdot mH_2O$$

wherein n is a number of from 3 to 5 and m is a number of from 3 to 5, which consists of porous particles composed of an aggregate of plate crystals having an average particle size of 1 to 50 μm and a specific surface area of 10 to 70 m$^2$/g, wherein in the fine pore size distribution of the particles, the volume of fine pores having a radius smaller than 100 Å is at least 0.02 cc/g and the volume of fine pores having a radius smaller than 75,000 Å is at least 0.8 cc/g.

This novel basic magnesium carbonate is highly improved over conventional basic magnesium carbonate in such properties as filling property, dispersibility and flowability.

10 Claims, No Drawings

BASIC MAGNESIUM CARBONATE AND PROCESS FOR PREPARATION THEREOF

This application is a continuation of application Ser. No. 07/709,813, filed Jun. 4, 1991 now abandoned.

BACKGROUND OF THE INVENTION

(1) Field of the Invention

The present invention relates to a novel basic magnesium carbonate and a process for the preparation thereof. More particularly, the present invention relates to a novel basic magnesium carbonate represented by the following general formula:

$$nMgCO_3 \cdot Mg(OH)_2 \cdot mH_2O$$

wherein n is a number of from 3 to 5 and m is a number of from 3 to 5, which consists of porous particles composed of an aggregate of plate crystals having an average particle size of 2 to 50 $\mu$m and a specific surface area of 10 to 70 $m^2/g$, wherein in the fine pore size distribution of the particles, the volume of fine pores having a radius smaller than 100 Å is at least 0.02 cc/g and the volume of fine pores having a radius smaller than 75,000 Å is at least 0.8 cc/g, and a process for the preparation of this novel basic magnesium carbonate.

(2) Description of the Prior Art

Basic magnesium carbonate is a known compound used for various purposes, for example, as a filler for a synthetic resin, a paper filler and a carrier for a cosmetics, medicine or agricultural chemical, and the preparation process has been known from old. In general, an aqueous slurry of a crystal of normal magnesium carbonate crystal is used as an intermediate material and is heated and aged at a temperature of 60° to 80° C. for 1 to several hours. After the filtration, the cake is dried at 110° to 150° C. Furthermore, a process for preparing spherical basic magnesium carbonate has already been proposed by us (see Japanese Unexamined Patent Publication No. 60-54915).

This spherical basic magnesium carbonate is a novel compound which is improved in powder characteristics such as the filling property, dispersibility and flowability and is advantageously used in various fields.

However, it has been found that even this spherical magnesium carbonate is not completely satisfactory as a carrier for a cosmetics, medicine or agricultural chemical.

SUMMARY OF THE INVENTION

We continued research on basic magnesium carbonate for many years and found that the fine pore size distribution of obtained particles differs according to the process for the preparation of basic magnesium carbonate. We furthered research and as the result, it was found that if a specific preparation process is selected, a basic magnesium carbonate not heretofore present, in which in the fine pore size distribution of particles, the volume occupied by fine pores having a radius smaller than 100 Å is as large as at least 0.02 cc/g, can be obtained. It also was found that if the above-mentioned specific structure is given to basic magnesium carbonate, satisfactory properties are manifested in the fields where basic magnesium carbonate has heretofore been used and new modes of application of basic magnesium carbonate will be developed.

We have now completed the present invention based on these novel findings.

More specifically, in accordance with the present invention, there is provided a novel basic magnesium carbonate represented by the following general formula (I):

$$nMgCO_3 \cdot Mg(OH)_2 \cdot mH_2O \qquad (I)$$

wherein n is a number of from 3 to 5 and m is a number of from 3 to 5, which consists of porous particles composed of an aggregate of plate crystals having an average particle size of 1 to 50 $\mu$m and a specific surface area of 10 to 70 $m^2/g$, wherein in the fine pore size distribution of the particles, the volume of fine pores having a radius smaller than 100 Å is at least 0.02 cc/g and the volume of fine pores having a radius smaller than 75,000 Å is at least 0.8 cc/g.

DETAILED DESCRIPTION OF THE INVENTION

The basic magnesium carbonate provided by the present invention has a composition represented by the following formula (I):

$$nMgCO_3 \cdot Mg(OH)_2 \cdot mH_2O \qquad (I)$$

wherein n is a number of from 3 to 5 and m is a number of from 3 to 5, in general, m is the same number as n, but a desired number can be selected for m by removing bound water by a heat treatment.

By the X-ray diffractometry, the basic magnesium carbonate of the present invention can be confirmed to be a crystalline substance, and by the X-ray diffractometry (Cu-$\alpha$), it is confirmed that characteristic peaks appear in the vicinity of $2\theta = 9.6°$, 27.4° and 32.5°. These properties are similar to those of known basic magnesium carbonate.

From a microscope photograph, it can be confirmed that the basic magnesium carbonate of the present invention consists of porous particles composed of an aggregate of plate crystals. The particles of the aggregate have an average particle size of 1 to 50 $\mu$m, preferably 3 to 20 $\mu$m, and a specific surface area of 10 to 70 $m^2/g$, preferably 15 to 45 $m^2/g$. A smaller average particle size is preferable for increasing the volume occupied by fine pores having a radius smaller than 100 Å in the pore size distribution of particles (hereinafter referred to as "fine pore volume"), but according to the existing preparation technique, it is very difficult to prepare particles having an average particle size smaller than the above-mentioned lower limit. If the average particle size exceeds the above-mentioned upper limit, it is impossible to adjust the fine pore volume within the range specified in the present invention.

Also the specific surface area of the particles has serious influences on the fine pore volume. In the particles having a specific surface area exceeding the above-mentioned upper limit, plate crystals grow too much and therefore, the fine pore volume becomes extremely small. In contrast, if the specific surface area of the particles is larger than the above-mentioned upper limit, the growth of plate crystals is insufficient and the stability is poor, and no good results can be obtained.

Since the basic magnesium carbonate provided according to the present invention consists of porous particles, the basic magnesium carbonate can have a bulk density covering a broad range. However, in view of the application modes, heavy magnesium carbonate is preferable, and it is generally preferred that the bulk density is in the range of from 0.2 to 0.9 g/cc, especially from 0.3 to 0.7 g/cc. In view of the easiness in filling and the easiness in handling in industrial applications, the shape of the basic magnesium carbonate is preferably spherical or elliptical. The spherical shape generally means that the ratio (b/a) of the long diameter (b) to the short diameter (a) of the particles is in the range of from 1.0 to 1.5, and the elliptical shape means that this ratio (b/a) is larger than 1.5 but smaller than 3.0.

The most characteristic feature of the basic magnesium carbonate provided by the present invention is that in the fine pore size distribution of the particles, the volume (fine pore volume) occupied by fine pores having a radius smaller than 100 Å is at least 0.02 cc/g and the volume (total fine pore volume) occupied by fine pores having a radius smaller than 75,000 Å is at least 0.8 cc/g. In connection with conventional basic magnesium carbonate, the relation of the fine pore size distribution to the physical properties has not been reported. It is considered that the reason is that research for expanding application fields of basic magnesium carbonate by changing the physical properties thereof has seldom been made and basic magnesium carbonate having certain specific properties cannot be prepared according to the conventional preparation process. In fact, the total pore volume of basic magnesium carbonate prepared according to the conventional preparation process is about 2.5 cc/g, but the basic magnesium carbonate has not substantially a measurable value for the fine pore volume. Furthermore, in the spherical basic magnesium carbonate prepared according to the process proposed by us in Japanese Unexamined Patent Publication No. 60-54915, the fine pore volume is only 0.005 to 0.008 cc/g.

In the present invention, by adopting the specific preparation process described hereinafter, the fine pore volume of the basic magnesium carbonate can be controlled to a desired value, whereby control of the physical properties of the basic magnesium carbonate becomes possible. More specifically, when the basic magnesium carbonate is used as an adsorbent in the fields of cosmetics, medicines and agricultural chemicals, the above-mentioned fine pore volume can increase the adsorption speed and can prevent ooze of adsorbed substances. If the basic magnesium carbonate is formed into a spherical or elliptical shape, these advantages are exerted synergistically with enhanced filling property, dispersibility and flowability. Accordingly, the basic magnesium carbonate of the present invention can be used more effectively and conveniently in the known application fields.

The fine pore volume and total pore volume of the particles of the basic magnesium carbonate of the present invention are factors that can be simply determined by a mercury porosimeter. In the present invention, it is important that the fine pore volume of the particles should be at least 0.02 cc/g, preferably 0.02 to 0.20 cc/g, especially preferably 0.03 to 0.15 cc/g. At the measurement using a mercury porosimeter, the fine pore volume can be measured at a precision corresponding to an error of about ±0.002 cc/g, and this fine pore volume can be clearly distinguished from the above-mentioned value of the known basic magnesium carbonate, and furthermore, by this factor, the basic magnesium carbonate obtained according to the preparation process described hereinafter can be distinguished from the conventional basic magnesium carbonate.

In the basic magnesium carbonate of the present invention, the total pore volume is not particularly critical if the total pore volume in the particles of the basic magnesium carbonate is at least 0.8 cc/g. When the preparation is carried out on an industrial scale, the upper limit of the total pore volume is about 2.0 cc/g. Therefore, in general, the total pore volume of the basic magnesium carbonate of the present invention is most preferably 0.8 to 1.5 cc/g.

The preparation process is not particularly critical, so far as the above-mentioned characteristic properties are given to the basic magnesium carbonate in the present invention. However, the fine pore volume of the basic magnesium carbonate is greatly influenced by the preparation process. Therefore, preferably, the preparation conditions are determined in advance. According to a typical process for preparing the basic magnesium carbonate easily on an industrial scale, a water-soluble magnesium salt in the solid state and a water-soluble carbonate in the solid state are supplied and reacted in an aqueous medium maintained at a temperature of from 40° C. to the boiling point, and the reaction mixture is allowed to stand still at a temperature within the above-mentioned range. The basic magnesium carbonate of the present invention can be obtained by recovering the obtained reaction product.

The water-soluble magnesium salt and water-soluble carbonate used in the above-mentioned process are not particularly critical. Known salts customarily used as the starting material of basic magnesium carbonate can be used. For example, magnesium chloride, magnesium sulfate and magnesium nitrate are preferably used as the water-soluble magnesium salt. As the water-soluble carbonate, there can be mentioned alkali metal carbonates such as sodium carbonate and potassium carbonate, and ammonium carbonate. Each of the water-soluble magnesium salt and water-soluble carbonate is preferably supplied in the solid state into an aqueous medium maintained at a temperature of from 40° C. to the boiling point, that is, the reaction temperature. Preferably, each water-soluble salt is used in such an amount that the concentration in the aqueous medium is 0.1 to 0.8 mole/l. In order to increase the yield of the magnesium component, it is preferred that the mixing ratio between the water-soluble magnesium salt and water-soluble carbonate be such that the amount of the water-soluble carbonate is equivalent to or slightly excessive over the amount of the water-soluble magnesium salt. If the reaction temperature is lower than 40° C., normal magnesium carbonate crystal is stable and no basic magnesium carbonate is obtained.

The reaction time is not particularly critical, but in general, the reaction time is selected within the range of from 1 minute to 1 hour.

The intensity of stirring the reaction mixture is preferably set so that precipitated normal magnesium carbonate crystal particles can keep a slurry state and the temperature and slurry concentration of the reaction mixture are uniform. The time of stirring the reaction mixture depends on the shape of the reaction vessel, the reaction volume, the shape and size of stirring blades and the stirring intensity, but it is generally preferred that the stirring time be the same as the time required for adding the water-soluble magnesium salt and/or the water-soluble carbonate or stirring be stopped within 5 minutes from the completion of the addition. If stirring is continued for a long time exceeding the above range, it is apprehended that aggregation of precipitated fine primary particles by dissolution and precipitation at the standing step will be disturbed.

In order to obtain the basic magnesium carbonate of the present invention, after the water-soluble magnesium salt and water-soluble carbonate are reacted under the above-mentioned conditions, a slurry of the precipitated normal magnesium carbonate crystal composed of fine primary particles is maintained at a temperature of from 40° C. to the boiling point, preferably the reaction temperature is maintained, or the slurry is naturally cooled, and standing should be carried out without stirring in the mother liquid, whereby the mother liquor is aged and the basic magnesium carbonate of the present invention is formed. In the conventional process for preparing basic magnesium carbonate, in order to keep the reaction mixture uniform and obtain basic magnesium carbonate having a uniform size, a slurry of normal magnesium carbonate crystal is converted and aged under stirring. However, if aging is conducted under stirring, the basic magnesium carbonate of the present invention cannot be obtained.

The aging time is not particularly critical, and in general, it is sufficient if stirring is conducted for at least 1 hour.

In the basic magnesium carbonate obtained according to the above-mentioned preparation process, the fine pore volume of the particles is at least 0.03 cc/g and is much larger than in the conventional basic magnesium carbonate. The obtained basic magnesium carbonate consists of porous particles composed of an aggregate of plate crystals, in which the ratio (b'/a) of the long diameter (b') to the short diameter (a) of the particles is generally in the range of from 1.0 to 1.5.

In the above-mentioned preparation process, if the starting water-soluble salt and water-soluble carbonate are not supplied in the solid state to the aqueous medium where the reaction conditions are maintained but they are supplied in the form of aqueous solutions prepared in advance and reacted, the fine pore volume of the particles of the obtained basic magnesium carbonate is not increased but is kept within the range of from 0.005 to 0.008 cc/g. Accordingly, in this case, the intended basic magnesium carbonate of the present invention cannot be obtained.

Furthermore, there can be considered an embodiment where the water-soluble carbonate is dissolved in water and the formed aqueous solution and the solid water-soluble magnesium salt are supplied to the reaction system. However, also in this embodiment, the fine pore volume of the particles of the obtained basic magnesium carbonate is not increased but is retained at a level of about 0.01 cc/g at highest. In contrast, according to an embodiment where the starting magnesium salt is dissolved in water in advance and the formed aqueous solution and the solid water-soluble carbonate are supplied to the reaction system, the fine pore volume of the particles of the obtained basic magnesium carbonate is somewhat larger than in the above-mentioned two embodiments and for example, a fine pore volume of up to about 0.02 cc/g can be obtained. Therefore, in the last-mentioned embodiment, if appropriate reaction conditions are selected, the intended basic magnesium carbonate of the present invention can be obtained.

The basic magnesium carbonate of the present invention can also be prepared by making a crystallizing assistant present in the reaction mixture. The presence of the crystallizing assistant is effective for obtaining a basic magnesium carbonate having a large pore volume of the particles. Even in the embodiment where the water-soluble magnesium salt and the water-soluble carbonate are independently dissolved in water in advance and the formed aqueous solutions are supplied to the reaction system, if an appropriate compound acting as the crystallizing assistant is made present in the reaction system and appropriate reaction conditions are selected, the fine pore volume of particles of the obtained basic magnesium carbonate can be increased to 0.02 cc/g or more. Any of compounds having a crystallization-promoting action can be used as the crystallizing assistant without any limitation. As the crystallizing assistant effective for increasing the fine pore volume of the basic magnesium carbonate of the present invention, there can be mentioned water-soluble salts of alkali metals, alkaline earth metals and metals of the aluminum group, and ammonium salts (water-soluble magnesium salts and water-soluble carbonates are excluded). Of these compounds, water-soluble salts of alkali metals and ammonium salts are especially preferably used. More specifically, there can be mentioned sodium chloride, ammonium chloride, sodium fluoride, sodium sulfate, sodium hexametaphosphate, sodium pyrophosphate, barium chloride and aluminum sulfate.

The amount used of the crystallizing assistant is not particularly critical, but it is generally preferred that the crystallizing assistant be used in an amount of 0.5 to 10% by weight based on the amount of the formed basic magnesium carbonate.

The reason why the basic magnesium carbonates obtained according to the above-mentioned reaction operations are different in the physical properties has not been completely elucidated. However, from the foregoing experimental results, we presume that the speeds of dissolution of the carbonate and magnesium salt in water in the reaction system and the reaction speed in these solutions have large influences, the speed of dissolution of the carbonate in water becomes a controlled speed, differences are brought about in the physical properties of the obtained basic magnesium carbonate, and the presence of the crystallizing assistant accelerates the growth of crystals and promotes formation of fine pores.

The basic magnesium carbonate of the present invention is a novel compound which is distinguishable over the known basic magnesium carbonate in that the fine pore volume of the particles is much larger. Since the fine pore volume of the particles is large, the speed of adsorption of cosmetics, medicines and agricultural chemicals is increased and ooze of adsorbed substances is effectively prevented. Moreover, this basic magnesium carbonate is excellent in such properties as filling property, dispersibility and flowability. Accordingly, the basic magnesium carbonate of the present invention are preferably used not only in the above-mentioned fields but also as a synthetic resin filler, a carrier for cosmetics and medicines, a food additive and a filler for a paper such as a heat-sensitive recording paper, a pigment and an ink filler.

EXAMPLES

The present invention will now be described in detail with reference to the following examples that by no means limit the scope of the invention.

In the examples and comparative examples given hereinafter, the physical properties were determined according to the following methods.

(1) Specific Surface Area (BET method utilizing adsorption of $N_2$)

A sample was dried at 150° C. for 1 hour, and the specific surface area was measured by a prompt surface are-measuring apparatus (Model SA-1000 supplied by Shibata Kagaku Kikai Kogyo).

(2) Fine Pore Volume

The fine pore volume was measured by using a porosimeter (Model 2000 supplied by Carlo-Erba Instruments).

(3) Bulk Density

The bulk density was measured according to JIS K-6220

(4) Average Particle Size

The average particle size was determined by using Coulter Maultisizer supplied by Coulter Electronics (the aperture size was 50 μm).

(5) Shape of Particles

The shape of particles was confirmed from a microscope photo (2,000 magnifications).

EXAMPLE 1

A reaction vessel having a capacity of 10 liters was charged with 5.1 l of water maintained at 90° C., and a powdery mixture of 590 g of $MgSO_4.7H_2O$ and 310 g of $Na_2CO_3$ was thrown into the reaction vessel over a period of 1 minute. Then, stirring was conducted for 1 minute, and the reaction liquid was allowed to stand still and aged for 1 hour while maintaining the reaction liquid at 90° C. Then, the reaction liquid was filtered, and the cake was washed with water and dried at 105° C. overnight.

The obtained basic magnesium carbonate had a composition represented by the formula of $4 MgCO_3.Mg(OH)_2.4H_2O$, and from the results of the X-ray diffractometry, it was confirmed that the basic magnesium carbonate had characteristic peaks at $2\theta = 9.6°$, 27.4° and 32.5°. The average particle size was 6.0 μm, the specific surface area was 22 m$^2$/g, the total pore volume was 1.16 cc/g, the fine pore volume was 0.055 cc/g, the bulk density was 0.44 g/cc, and the shape of the particles was substantially spherical.

COMPARATIVE EXAMPLE 1

In 2.55 l of water was dissolved 590 g of $MgSO_4.7H_2O$ and separately, 310 g of $Na_2CO_3$ was dissolved in 2.55 l of water, and both the aqueous solutions were charged into a reaction vessel having a capacity of 10 liters. Then, the procedures of Example 1 were repeated in the same manner. In the obtained basic magnesium carbonate, the average particle size was 6.0 μm, the specific surface area was 28 m$^2$/g, the total fine pore volume was 1.08 cc/g. the fine pore volume was 0.008 cc/g, and the bulk density was 0.46 g/cc.

COMPARATIVE EXAMPLE 2

A reaction vessel having a capacity of 10 liters was charged with 5.1 l of water maintained at 80° C., and 310 g of $Na_2CO_3$ was added and dissolved in water in the vessel. Then, 590 g of powdery $MgSO_4.7H_2O$ was added to the aqueous solution over a period of 1 minute. Then, the procedures of Example 1 were repeated in the same manner. In the obtained basic magnesium carbonate, the average particle size was 6.4 μm, the specific surface area was 16 m$^2$/g, the bulk density was 0.4 g/cc, the fine pore volume was 0.01 cc/g, and the total pore volume was 1.12 cc/g.

EXAMPLE 2

A reaction vessel having a capacity of 10 liters was charged with 5.1 l of water maintained at 80° C. and 30 g of $NH_4Cl$ was dissolved in water in the vessel. Then, 590 g of $MgSO_4.7H_2O$ was added and dissolved, and 310 g of powdery $Na_2CO_3$ was supplied into the reaction vessel over a period of 1 minute. Then, the procedures of Example 1 were repeated in the same manner to obtain a basic magnesium carbonate.

The obtained basic magnesium carbonate was similar to the product obtained in Example 1 in the composition and X-ray diffraction pattern. In the obtained basic magnesium carbonate, the average particle size was 5.3 μm. the surface area was 14 m$^2$/g, the total pore volume was 1.10 cc/g, the fine pore volume was 0.027 cc/g, the bulk density was 0.18 g/cc, and the particles had a plate-like shape though spherical particles were partially included.

EXAMPLE 3

A reaction vessel having a capacity of 10 liters was charged with 5.1 l of water maintained at a reaction temperature shown in Table 1. Then, a water-soluble magnesium salt and a water-soluble carbonate, shown in Table 1, were added to water containing the crystallizing assistants shown in Table 1. In each of runs 1 through 4, the salts were mixed in the powdery state as in Example 1 and the mixture was added to water. In run 5, both the salts were mixed in the form of aqueous solutions. Then, basic magnesium carbonates were formed in the same manner as described in Example 1. The physical properties of the obtained basic magnesium carbonates are shown in Table 1.

Each of the obtained basic magnesium carbonates was similar to the product obtained in Example 1 in the composition and X-ray diffraction pattern. The particles of each of the obtained basic magnesium carbonates had a substantially spherical shape.

TABLE 1

| Run No. | Water-Soluble Magnesium Salt kind | amount used (g) | Water-Soluble Carbonate kind | amount used (g) | Crystallizing Assistant kind | amount used (g) | Reaction Temperature (°C.) | Average Particle Size (μm) | Specific Surface Area (m$^2$/g) | Fine Pore Volume × 10$^{-3}$ (cc/g) | Total Pore Volume (cc/g) | Bulk Density (g/cc) |
|---|---|---|---|---|---|---|---|---|---|---|---|---|
| 1 | $MgSO_4.7H_2O$ | 590 | $Na_2CO_3$ | 310 | $Na_2SO_4.10H_2O$ | 20 | 75 | 6.0 | 26 | 53 | 0.98 | 0.50 |
| 2 | $MgSO_4.7H_2O$ | 590 | $Na_2CO_3$ | 310 | $NH_4Cl$ | 30 | 80 | 5.8 | 28 | 65 | 1.01 | 0.43 |
| 3 | $MgSO_4.$ | 590 | $Na_2CO_3$ | 310 | NaF | 20 | 85 | 3.8 | 30 | 60 | 1.25 | 0.32 |

TABLE 1-continued

| Run No. | Water-Soluble Magnesium Salt kind | amount used (g) | Water-Soluble Carbonate kind | amount used (g) | Crystallizing Assistant kind | amount used (g) | Reaction Temperature (°C.) | Average Particle Size (μm) | Specific Surface Area (m²/g) | Fine Pore Volume × $10^{-3}$ (cc/g) | Total Pore Volume (cc/g) | Bulk Density (g/cc) |
|---|---|---|---|---|---|---|---|---|---|---|---|---|
| 4 | $MgSO_4 \cdot 7H_2O$ | 590 | $Na_2CO_3$ | 310 | NaCl | 20 | 80 | 4.3 | 38 | 48 | 1.18 | 0.4 |
| 5 | $MgSO_4 \cdot 7H_2O$ (aqueous solution) | 590 | $Na_2CO_3$ (aqueous solution) | 310 | $Al_2(SO_4)_3$ $16H_2O$ | 30 | 85 | 5.5 | 28 | 20 | 1.22 | 0.38 |

EXAMPLE 4

The basic magnesium carbonates obtained in Examples 1 through 3 were subjected to a test of mixing with original substances of agricultural chemicals and an oil absorption test according to methods described below.

As the original substance of agricultural chemicals, there were used

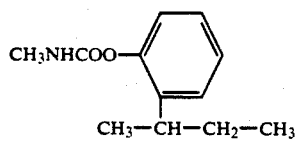

(hereinafter referred to as "B.P.M.C") and

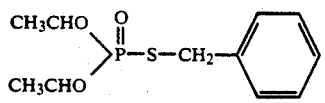

(hereinafter referred to as "I.B.P"). At the mixing test with I.B.P, the time of addition of the original substance of agricultural chemicals was adjusted to 5 minutes.

(1) Mixing Test

A plastic vessel having an inner volume of 500 ml, which was provided with rotatory stirring blades rotated by a motor and an adding opening, was charged with 20 g of a sample of basic magnesium carbonate, and 20 ml of the original substance of agricultural chemicals was dropped into the vessel from the adding opening over a period of 9 to 10 minutes. Mixing was carried out for 30 minutes from the point of initiation of the dropwise addition at a stirring blade rotation speed of 200 rpm. After the mixing, the weight of the sample adhering to the inner wall of the vessel and the rotary stirring blades was measured.

(2) Oil Absorption Test

A sample of basic magnesium carbonate which had passed through a 32-mesh sieve was charged in a vessel having a diameter of 70 mm and a height of 16 mm and having an opened top face, to an angle of repose of the angle. Then, a weight was placed on a watch glass having a diameter of 110 mm, and the weight having a total weight of 100 g was placed on the sample to compress the sample. After 15 seconds, the weight was pulled up. Then, 0.2 ml of boiling oil was contacted quietly with the surface of the compressed sample so that the oil adhered to the sample surface. The time required for absorbing all of the boiling oil in the sample from the point of the start of the contact was measured. The measurement was carrier out in a room maintained at an air temperature of 20° C.

The obtained results are shown in Table 2.

TABLE 2

| Run No. | Example No. of Basic Magnesium Carbonate | Fine Pore Volume × $10^{-3}$ (cc/g) | Oil absorption Speed (sec) | Adhering Amount (g) at Mixing Test with B.P.M.C · | Adhering Amount (g) at Mixing Test with I.B.P |
|---|---|---|---|---|---|
| 1 | 1 | 55 | 89 | 0.5 | 0.6 |
| 2 | 3-1 | 53 | 91 | 0.5 | 0.7 |
| 3 | 3-2 | 65 | 85 | 0.4 | 0.6 |
| 4 | 3-3 | 60 | 87 | 0.5 | 0.7 |
| 5 | 3-4 | 48 | 90 | 0.8 | 0.6 |
| 6 | 3-5 | 20 | 99 | 1.0 | 1.3 |
| 7 | Comparative Example 1 | 8 | 130 | 7.2 | 6.5 |
| 8 | commercially available product* | 2 | 200 | 13.6 | 15.2 |

*Tokuyama Magnesium Carbonate TT supplied by Tokuyama Soda was used.

I claim:

1. A basic magnesium carbonate represented by the following general formula:

$$nMgCO_3 \cdot Mg(OH)_2 \cdot mH_2O$$

wherein n is a number of from 3 to 5 and m is a number of from 3 to 5, which consists of substantially spherical porous particles composed of an aggregate of plate crystals, said porous particles having an average particle size of 1 to 50 μm and a specific surface area o 10 to 70 m²/g, wherein in the fine pore size distribution of the porous particles, defined as the volume of fine pores having a radius smaller than 100 Å, is at least 0.03 cc/g and the volume of fine pores having a radius smaller than 75,000 Å is at least 0.8 cc/g.

2. A basic magnesium carbonate according to claim 1, wherein the bulk density of the porous particles is 0.2 to 0.7 g/cc.

3. A basic magnesium carbonate according to claim 1, wherein the average particles size is 2 to 20 82 m, the specific surface area is 15 to 45 m²/g, the volume occupied by fine pores having a radius smaller than 100 Å in the fine pore size distribution of the particles is 0.03 to 0.15 cc/g, and the bulk density is 0.3 to 0.5 g/cc.

4. A process for the preparation of a basic magnesium carbonate, which comprises supplying simultaneously a water-soluble magnesium salt in the solid state and a water-soluble carbonate in the solid state into an aqueous medium maintained at an effective temperature of from 40° C. to the boiling point to react both the salts, and allowing the reaction mixture to stand still under the above-mentioned temperature range, and separating a basic magnesium carbonate represented by the following general formula:

nMgCO₃.Mg(OH)₂. mH₂O wherein n is a number of from 3 to 5 and m is a number of from 3 to 5,
which consists of substantially spherical porous particles composed of an aggregate of plate crystals, said porous particles having an average particle size of 1 to 50 μm and a specific surface area of 10 to 70 m²/g, wherein the fine pore size distribution of the porous particles, defined as the volume of fine pores having a radius smaller than 100 Å, is at least 0.03 cc/g and the volume of fine pores having a radius smaller than 75,000 Å is at least 0.8 cc/g.

5. A process for preparing of a basic magnesium carbonate according to claim 4, and separating a basic magnesium carbonate, wherein the average particle size is 2 to 20 μm, the specific surface area is 15 to 45 m²/g, the volume occupied by fine pores having a radius smaller than 100 Å in the fine pore size distribution of the particles is 0.03 to 0.15 cc/g, and the bulk density is 0.3 to 0.5 g/cc.

6. The process for preparing a basic magnesium carbonate according to claim 4, wherein prior to supplying the magnesium slat and soluble carbonate into the aqueous medium there is added to aqueous medium a crystallizing assistant.

7. The process for preparing a basic magnesium carbonate according to claim 6, wherein the crystallizing assistant is at least one compound selected from the group consisting of sodium chloride, ammonium chloride, sodium fluoride, sodium sulfate and aluminum sulfate.

8. The process for preparing a basic magnesium carbonate according to claim 6 wherein the water-soluble magnesium salt is magnesium sulfate and the water-soluble carbonate is sodium carbonate.

9. The process for preparing a basic magnesium carbonate according to claim 7 wherein the water-soluble magnesium salt is magnesium sulfate and the water-soluble carbonate is sodium carbonate.

10. A process for the preparation of a basic magnesium carbonate, which comprises supplying simultaneously a water-soluble magnesium salt in the solid state and a water-soluble carbonate in the solid state into an aqueous medium maintained at a temperature of from 75° C. to 90° C. to react both the salts, ad allowing the reaction mixture to stand still under the above-mentioned temperature range, and separating a basic magnesium carbonate represented by the following general formula:

nMgCO₃.Mg(OH)₂.mH₂O wherein n is a number of from 3 to 5 and m is a number of from 3 to 5,
which consists of substantially spherical porous particles composed of an aggregate of plate crystals, said porous particles having an average particles size of 1 to 50 μm and a specific surface area of 10 to 70 m²/g, wherein the fine pore size distribution of the porous particles, defined as the volume of fine pores having a radius smaller than 100 Å, is at least 0.03 cc/g and the volume of fine pores having a radium smaller than 75,000 Å is at least 0.8 cc/g.

* * * * *